United States Patent
Puthoor et al.

(10) Patent No.: US 11,507,522 B2
(45) Date of Patent: Nov. 22, 2022

(54) MEMORY REQUEST PRIORITY ASSIGNMENT TECHNIQUES FOR PARALLEL PROCESSORS

(71) Applicant: Advanced Micro Devices, Inc., Santa Clara, CA (US)

(72) Inventors: Sooraj Puthoor, Austin, TX (US); Kishore Punniyamurthy, Austin, TX (US); Onur Kayiran, West Henrietta, NY (US); Xianwei Zhang, Austin, TX (US); Yasuko Eckert, Redmond, WA (US); Johnathan Alsop, Seattle, WA (US); Bradford Michael Beckmann, Redmond, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/706,421

(22) Filed: Dec. 6, 2019

(65) Prior Publication Data

US 2021/0173796 A1     Jun. 10, 2021

(51) Int. Cl.
    *G06F 13/18*     (2006.01)
    *G06F 13/16*     (2006.01)

(52) U.S. Cl.
    CPC .......... *G06F 13/18* (2013.01); *G06F 13/1668* (2013.01)

(58) Field of Classification Search
None
See application file for complete search history.

(56) References Cited

U.S. PATENT DOCUMENTS

| 4,760,515 A | 7/1988 | Malmquist et al. |
| 5,553,223 A | 9/1996 | Greenlee et al. |

(Continued)

FOREIGN PATENT DOCUMENTS

| WO | 9638791 A1 | 12/1996 |
| WO | 0031925 A1 | 6/2000 |

OTHER PUBLICATIONS

Non-Final Office Action in U.S. Appl. No. 15/725,912, dated Jul. 12, 2018, 10 pages.

(Continued)

*Primary Examiner* — Henry Tsai
*Assistant Examiner* — Aurangzeb Hassan
(74) *Attorney, Agent, or Firm* — Kowert Hood Munyon Rankin and Goetzel PC; Rory D. Rankin

(57) ABSTRACT

Systems, apparatuses, and methods for implementing memory request priority assignment techniques for parallel processors are disclosed. A system includes at least a parallel processor coupled to a memory subsystem, where the parallel processor includes at least a plurality of compute units for executing wavefronts in lock-step. The parallel processor assigns priorities to memory requests of wavefronts on a per-work-item basis by indexing into a first priority vector, with the index generated based on lane-specific information. If a given event is detected, a second priority vector is generated by applying a given priority promotion vector to the first priority vector. Then, for subsequent wavefronts, memory requests are assigned priorities by indexing into the second priority vector with lane-specific information. The use of priority vectors to assign priorities to memory requests helps to reduce the memory divergence problem experienced by different work-items of a wavefront.

18 Claims, 9 Drawing Sheets

(56) References Cited

U.S. PATENT DOCUMENTS

| | | | |
|---|---|---|---|
| 5,706,502 | A | 1/1998 | Foley et al. |
| 5,761,513 | A | 6/1998 | Yellin et al. |
| 5,815,653 | A | 9/1998 | You et al. |
| 5,923,885 | A | 7/1999 | Johnson et al. |
| 6,058,393 | A | 5/2000 | Meier et al. |
| 6,119,247 | A | 9/2000 | House et al. |
| 6,138,140 | A | 10/2000 | Yokote |
| 6,618,854 | B1 | 9/2003 | Mann |
| 7,076,569 | B1 * | 7/2006 | Bailey ............... H04L 69/12 709/212 |
| 7,127,573 | B1 * | 10/2006 | Strongin ............ G06F 13/1626 711/158 |
| 7,150,021 | B1 * | 12/2006 | Vajjhala ............. G06F 13/364 718/104 |
| 7,596,647 | B1 | 9/2009 | Van Dyke et al. |
| 8,448,001 | B1 | 5/2013 | Zhu et al. |
| 9,529,400 | B1 | 12/2016 | Kumar et al. |
| 9,594,621 | B1 | 3/2017 | Navilappa |
| 9,886,414 | B2 | 2/2018 | Yun et al. |
| 9,971,700 | B2 | 5/2018 | Loh |
| 9,983,652 | B2 | 5/2018 | Piga et al. |
| 10,067,796 | B1 | 9/2018 | Metcalf |
| 10,503,438 | B1 * | 12/2019 | La Fratta ............... G06F 3/061 |
| 10,558,591 | B2 | 2/2020 | Smith et al. |
| 10,664,285 | B1 * | 5/2020 | Bedy ................. G06F 9/4881 |
| 10,725,957 | B1 * | 7/2020 | Davis ................ G06F 13/4265 |
| 10,861,504 | B2 | 12/2020 | Tsien et al. |
| 2003/0035371 | A1 | 2/2003 | Reed et al. |
| 2003/0172149 | A1 | 9/2003 | Edsall et al. |
| 2003/0191857 | A1 | 10/2003 | Terrell et al. |
| 2004/0093404 | A1 | 5/2004 | Snyder et al. |
| 2005/0160320 | A1 * | 7/2005 | Elez .................. G06F 11/28 714/33 |
| 2005/0198459 | A1 | 9/2005 | Bogin et al. |
| 2005/0228531 | A1 | 10/2005 | Genovker et al. |
| 2005/0268051 | A1 * | 12/2005 | Hill ................... G06F 13/18 711/158 |
| 2006/0109829 | A1 | 5/2006 | O'Neill |
| 2006/0165115 | A1 | 7/2006 | Warren et al. |
| 2006/0171329 | A1 | 8/2006 | Mng |
| 2008/0120441 | A1 | 5/2008 | Loewenstein |
| 2008/0126750 | A1 | 5/2008 | Sistla |
| 2009/0016355 | A1 | 1/2009 | Moyes |
| 2009/0168782 | A1 | 7/2009 | Beshai |
| 2010/0211720 | A1 | 8/2010 | Satpathy et al. |
| 2010/0303075 | A1 * | 12/2010 | Tripathi ............... G06F 13/385 370/392 |
| 2011/0035529 | A1 | 2/2011 | Wang et al. |
| 2011/0119526 | A1 | 5/2011 | Blumrich et al. |
| 2011/0138098 | A1 | 6/2011 | Satpathy et al. |
| 2011/0219208 | A1 | 9/2011 | Asaad et al. |
| 2012/0059962 | A1 | 3/2012 | Lai |
| 2012/0072563 | A1 | 3/2012 | Johnsen et al. |
| 2012/0221767 | A1 | 8/2012 | Post et al. |
| 2013/0339592 | A1 * | 12/2013 | Yu ..................... G06F 13/1668 711/105 |
| 2014/0181467 | A1 * | 6/2014 | Rogers ............... G06F 9/30036 712/22 |
| 2014/0192583 | A1 | 7/2014 | Rajan et al. |
| 2014/0201471 | A1 | 7/2014 | Cutter et al. |
| 2014/0281083 | A1 | 9/2014 | Canepa et al. |
| 2014/0344528 | A1 * | 11/2014 | Kini .................. G06F 13/1663 711/151 |
| 2015/0089008 | A1 * | 3/2015 | Sridharan .......... H04L 47/2433 709/207 |
| 2015/0120978 | A1 | 4/2015 | Kalyanasundharam et al. |
| 2015/0220460 | A1 | 8/2015 | Litch et al. |
| 2015/0269396 | A1 | 9/2015 | Grafton |
| 2016/0055005 | A1 * | 2/2016 | Hsu .................. G06F 9/3887 712/22 |
| 2016/0094435 | A1 | 3/2016 | Goss et al. |
| 2016/0127191 | A1 | 5/2016 | Nair |
| 2016/0148143 | A1 * | 5/2016 | Anderson .......... G06Q 10/06316 705/7.26 |
| 2016/0191420 | A1 | 6/2016 | Nagarajan et al. |
| 2016/0210381 | A1 | 7/2016 | Singleton et al. |
| 2016/0378168 | A1 | 12/2016 | Branover et al. |
| 2017/0339106 | A1 | 11/2017 | Rimmer et al. |
| 2018/0048562 | A1 | 2/2018 | Meyer |
| 2018/0063016 | A1 | 3/2018 | Gulati et al. |
| 2018/0067775 | A1 | 3/2018 | Frandzel et al. |
| 2019/0013965 | A1 * | 1/2019 | Sindhu ............... G06F 13/1668 |
| 2019/0188132 | A1 * | 6/2019 | Yap .................. G06F 12/084 |
| 2019/0199617 | A1 | 6/2019 | Kalyanasundharam et al. |
| 2019/0272240 | A1 * | 9/2019 | Kachare ............. G06F 13/4027 |
| 2019/0370173 | A1 * | 12/2019 | Boyer ............... G06F 12/0888 |
| 2020/0089609 | A1 * | 3/2020 | Colline ............. G06F 12/0804 |
| 2020/0226093 | A1 * | 7/2020 | Butcher ............. G06F 13/18 |
| 2020/0304426 | A1 * | 9/2020 | Zhao ................ H04L 49/25 |

OTHER PUBLICATIONS

Final Office Action in U.S. Appl. No. 15/725,912, dated Feb. 7, 2019, 15 pages.
International Search Report and Written Opinion in International Application No. PCT/US2018/051542, dated Dec. 12, 2018, 12 pages.
International Search Report and Written Opinion in International Application No. PCT/US2018/051782, dated Jan. 4, 2019, 14 pages.
Non-Final Office Action in U.S. Appl. No. 15/850,616, dated Mar. 14, 2019, 12 pages.
Final Office Action in U.S. Appl. No. 15/850,616, dated Jul. 23, 2019, 14 pages.
Ausavarungnirun et al., "Exploiting Inter-Warp Heterogeneity to Improve GPGPU Performance", 2015 International Conference on Parallel Architecture and Compilation (PACT), Oct. 2015, 14 pages.
Jiménez, Daniel A., "Insertion and Promotion for Tree-Based PseudoLRU Last-Level Caches", 2013 46th Annual IEEE/ACM International Symposium on Microarchitecture (MICRO), Dec. 2013, pp. 284-296.

* cited by examiner

MEMORY REQUEST PRIORITY ASSIGNMENT TECHNIQUES FOR PARALLEL PROCESSORS

BACKGROUND

Description of the Related Art

Modern parallel processors (e.g., graphics processing units (GPUs)) include structures for executing multiple threads in parallel. A thread can also be referred to herein as a "work-item". A group of work-items is also referred to herein as a "warp" or "wavefront". Wavefronts often stall at wait count instructions waiting for any outstanding memory requests to complete. Thus, the longest latency memory requests associated with a given wait count will be on the wavefront's critical path. This is often referred to as a memory divergence problem, with "memory divergence" referring to the difference in arrival times for requests pending during a wait count instruction. For example, the memory requests for some threads within a wavefront hit in the cache while other threads from the same wavefront miss in the cache. When a wavefront executes a waitcnt( ) instruction, that wavefront gets blocked until the number of memory instructions specified by that waitcnt( ) instruction is retired. Application performance can be significantly affected by memory divergence.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing memory request priority assignment techniques for parallel processors are disclosed herein. In one implementation, a system includes at least a processor coupled to a memory subsystem, where the processor includes at least a plurality of compute units for executing wavefronts in lock-step. The processor assigns priorities to memory requests of wavefronts on a per-lane basis by indexing into a first priority vector, with the index generated based on lane-specific information. If a given event is detected, a second priority vector is generated by applying a given priority promotion vector to the first priority vector. Then, for subsequent wavefronts, memory requests are assigned priorities by indexing into the second priority vector with lane-specific information. The memory subsystem reorders and/or allocates shared resources to requests generated by the wavefronts according to priorities assigned to the requests. The use of priority vectors to assign priorities to memory requests helps to reduce the memory divergence problem experienced by different work-items of a wavefront.

Figure 1:
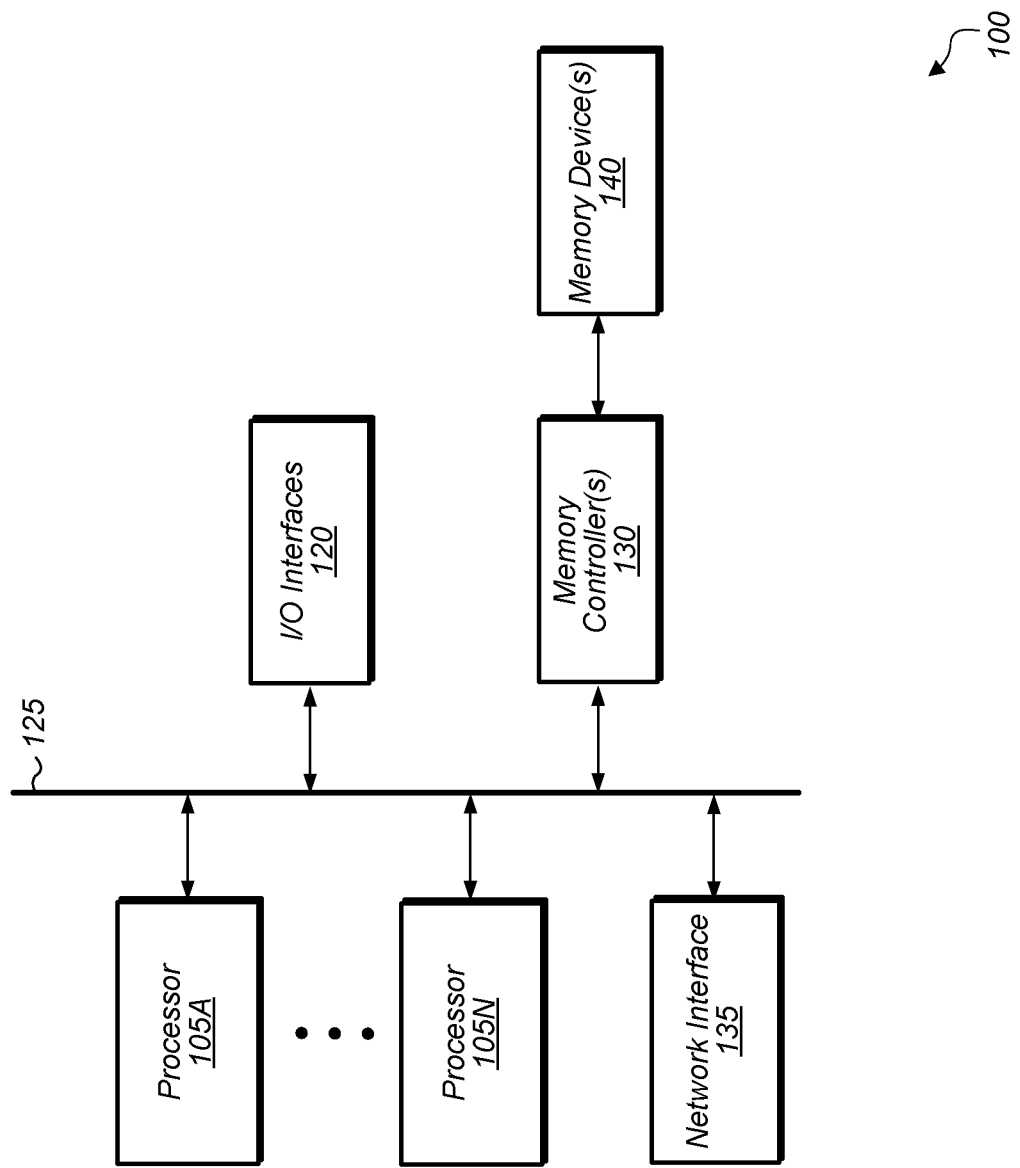
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, and memory device(s) 140. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors.

Memory controller(s) 130 are representative of any number and type of memory controllers accessible by processors 105A-N and I/O devices (not shown) coupled to I/O interfaces 120. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others. It is noted that memory controller(s) 130 and memory device(s) 140 can collectively be referred to herein as a "memory subsystem".

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
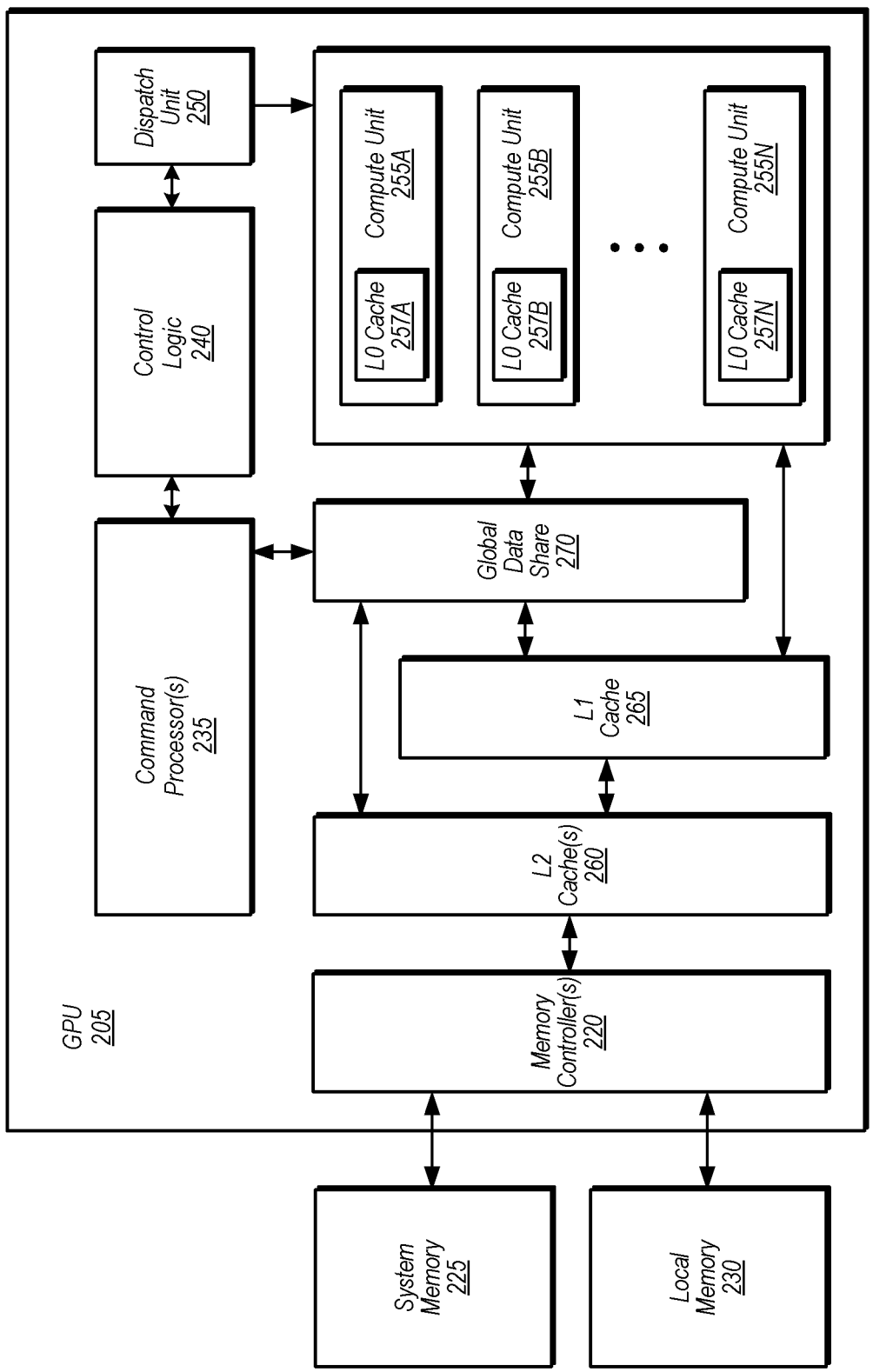
FIG. 2 is a block diagram of another implementation of a computing system.

Turning now to FIG. 2, a block diagram of another implementation of a computing system 200 is shown. In one implementation, system 200 includes GPU 205, system memory 225, and local memory 230. System 200 also includes other components which are not shown to avoid obscuring the figure. GPU 205 includes at least command processor(s) 235, control logic 240, dispatch unit 250, compute units 255A-N, memory controller(s) 220, global data share 270, shared level one (L1) cache 265, and level two (L2) cache(s) 260. It should be understood that the components and connections shown for GPU 205 are merely representative of one type of GPU. This example does not preclude the use of other types of GPUs (or other types of parallel processors) for implementing the techniques presented herein. In other implementations, GPU 205 includes other components, omits one or more of the illustrated components, has multiple instances of a component even if only one instance is shown in FIG. 2, and/or is organized in other suitable manners. Also, each connection shown in FIG. 2 is representative of any number of connections between components. Additionally, other connections can exist between components even if these connections are not explicitly shown in FIG. 2.

In various implementations, computing system 200 executes any of various types of software applications. As part of executing a given software application, a host CPU (not shown) of computing system 200 launches kernels to be performed on GPU 205. Command processor(s) 235 receive kernels from the host CPU and use dispatch unit 250 to dispatch wavefronts of these kernels to compute units 255A-N. Control logic 240 includes logic for determining the priority that should be assigned to memory requests of threads of the dispatched wavefronts. Control logic 240 also includes logic for updating the priority determination mechanism in response to detecting one or more events. Threads within kernels executing on compute units 255A-N read and write data to corresponding local L0 caches 257A-N, global data share 270, shared L1 cache 265, and L2 cache(s) 260 within GPU 205. It is noted that each local L0 cache 257A-N and/or shared L1 cache 265 can include separate structures for data and instruction caches. While the implementation shown in system 200 has a 3-level cache hierarchy, it should be understood that this is merely one example of multi-level cache hierarchy that can be used. In other implementations, other types of cache hierarchies with other numbers of cache levels can be employed.

It is noted that L0 caches 257A-N, global data share 270, shared L1 cache 265, L2 cache(s) 260, memory controller 220, system memory 225, and local memory 230 can collectively be referred to herein as a "memory subsystem". This memory subsystem is able to receive memory requests and associated priorities. The memory requests are processed by the memory subsystem according to the priorities. The memory subsystem services higher priority memory access requests prior to servicing lower priority memory access requests. Prioritizing memory access requests can lead to higher priority requests having a decreased latency and an overall improvement of the performance of system 200. In some implementations, one or more components within the memory subsystem include multiple memory request queues that have associated priority levels. These components of memory subsystem can place or store the memory request in an appropriate input queue based on the determined level of priority. Other mechanisms for differentiating memory requests based on their assigned priorities are possible and are contemplated.

Figure 3:
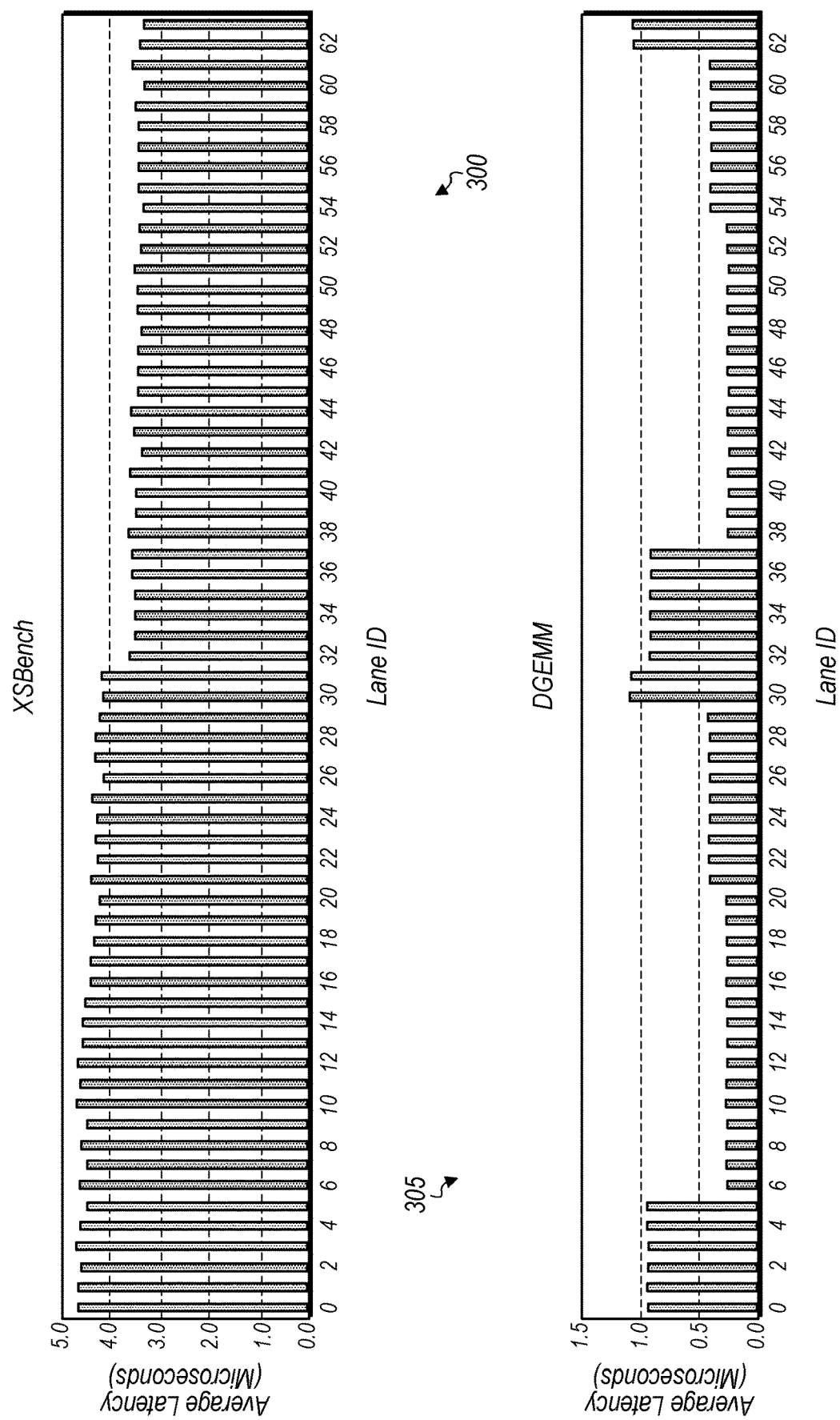
FIG. 3 illustrates diagrams of the average memory latency for work-items of a wavefront for two different benchmarks.

Referring now to FIG. 3, diagrams of the average memory latency for work-items of a wavefront for two different benchmarks 300 and 305 are shown. Simulations have revealed that application performance can be significantly affected by memory divergence, with divergent behavior manifesting itself differently across different hardware lanes of a processor executing corresponding work-items of a wavefront. The diagrams in FIG. 3 demonstrate this observation. Diagram 300 displays the average memory latency per lane ID when executing the XSbench benchmark. For this example, each lane represents a hardware lane executing an individual work-item of a wavefront. The XSbench benchmark is an application modeling a computationally intensive part of a Monte Carlo transport algorithm. Diagram 305 displays the average memory latency per lane ID when executing the double precision general matrix multiplication (DGEMM) benchmark. The DGEMM benchmark is a multi-threaded, dense matrix multiplication application designed to measure the sustained floating-point computational rate of a processor.

For XSbench benchmark 300, every lane tends to have a different latency value, with lanes 0-31 typically incurring more latency. For double-precision general matrix multiplication (DGEMM) benchmark 305, work-items executing on hardware lanes 0-5, 30-37, and 62-63 typically observe longer latencies compared to other lanes. Such differences across applications occur due to many reasons including imbalanced load assignment, coalescing behavior (e.g., XSBench has poor coalescing behavior, leading to each lane incurring different latency values), cache hits/misses, memory address mapping, and so on. The methods and mechanisms presented herein aim to prioritize memory requests that are on the critical path by exploiting the unique divergent behavior for a particular workload.

Figure 4:
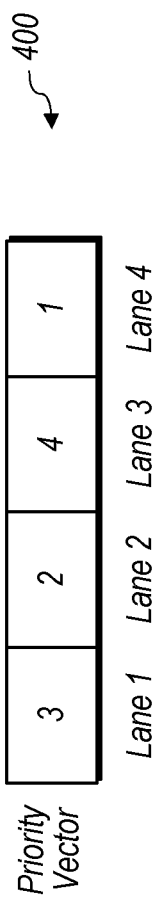
FIG. 4 is a block diagram of one implementation of a priority vector for use with a static priority assignment scheme.

Turning now to FIG. 4, a diagram of one implementation of a priority vector 400 for use with a static priority assignment scheme is shown. In the example shown, a priority associated with each of four hardware lanes is illustrated for ease of discussion. However, a given processing device may have any number of hardware lanes depending on the implementation. In one implementation, a static priority assignment scheme uses priority vector 400 to store different priority levels. The number of values in a priority vector can vary according to the implementation. Priority vector 400 is used to determine the priority of a request corresponding to that lane. For example, in one implementation, control logic indexes into priority vector 400 using information (e.g., program counter, opcode) specific to the instruction that generated the memory request, a wavefront identifier (ID), and/or a lane ID. A wavefront ID is defined as the ID (e.g., number) assigned to each wavefront. The wavefront ID is used to differentiate between different wavefronts that are executed by the processor. The priority is retrieved from the corresponding entry and assigned to the request. In one implementation, priority vector 400 is indexed exclusively by lane ID. It is noted that in alternative implementations, priority vector 400 could be indexed based on other combinations of previously described information. For example, in another implementation, neighboring lanes are grouped together to access the same index, since the neighboring lanes are likely to exhibit similar behavior.

As shown in FIG. 4, priority vector 400 includes four entries with the leftmost entry corresponding to lane 1 of a processing device and the rightmost entry corresponding to lane 4 of the processing device. As shown in the example, lane 1 is associated with a priority of "3" and lane 4 is associated with a priority of "1" where the higher number indicates a higher priority in this example. In one implementation, a hardware lane ID on which the request is executed is used to index into priority vector 400. For example, in one implementation, the lowest two bits of the hardware lane ID are used to index into priority vector 400. In one implementation, in the static priority assignment method, genetic or other algorithms are used to identify the priority vector values for different entries. As used herein, the term "genetic algorithm" is defined as an algorithm for selecting and propagating the preferred priority vector values to the next generation. Also, some amount of randomization is added to successive generations. In each generation, a new set of priority vector values is created using a portion of the preferred priority vector values from the previous generation while also optionally introducing a random value. Each generation's priority vector is evaluated with respect to a fitness function. After many generations, the genetic algorithm tends to converge on an optimal solution.

In one implementation, the process is started by assigning random values to each entry of priority vector 400. The random values can range from a LOW_THRESHOLD to a HIGH_THRESHOLD, where HIGH_THRESHOLD—LOW_THRESHOLD gives the number of prioritization levels that the algorithm can assign. The number of priority levels are configurable by changing the LOW_THRESHOLD and HIGH_THRESHOLD values. The different prioritization vector samples are then generated by changing the priority values at random lane locations or adjusting the indexing function to use different bits of information (e.g., lane ID) or the same bits in different ways. In other words, adjusting the indexing function changes how each request maps into priority vector 400. Then, a test suite is run and the algorithm converges with preferred values for priority vector 400 and the indexing function that are predicted to yield a desired performance level based on a fitness function. In one implementation, the test suite includes a predetermined set of applications that represents the diverse class of applications being targeted for optimization.

The fitness function in this case is the function that maps the priority vector values to the parallel processor performance and the optimization here is to choose the priority vector values that result in the best performance. After feeding the prioritization vector samples to the algorithm, the algorithm then comes up with a priority vector and indexing function optimized for performance. The same algorithm can be used to optimize kernels for power or for reducing the memory bandwidth consumption by changing the fitness function. For example, when optimizing for power, the fitness function maps the priority vector values to power consumption and comes up with the best priority vector that reduces the average power consumption of the entire testing suite.

Once the preferred priority vector and indexing function are generated by the algorithm, this vector is used to assign priorities to memory requests for actual applications. It is noted that the preferred priority vector and indexing function can be generated using any suitable combination of software and/or hardware. In one implementation, the preferred priority vector and indexing function are generated using one or more test kernels, and then the preferred priority vector and indexing function are used with actual kernels in real-world use cases. In another embodiment, multiple priority vectors, each optimized for a different constraint (e.g., power, performance, energy), are generated so that the user (or a system management unit) can dynamically select one for a desired optimization. Alternatively, multiple priority vectors can be used for a single program to address phase behaviors. In one implementation, each application (or a class of applications with similar characteristics) has its own priority vector that is predicted to yield the best performance. Before starting an application, the hardware uses the application's priority vector for assigning priorities to the memory requests. In one implementation, a specific priority vector is generated by tuning the genetic, or other, algorithm with a test suite that shares the same characteristics of the targeted application. In another implementation, a specific priority vector is generated by tuning the algorithm with a real-world application. In this implementation, the specific priority vector is continually updated as different applications are executed in real-time.

Figure 5:
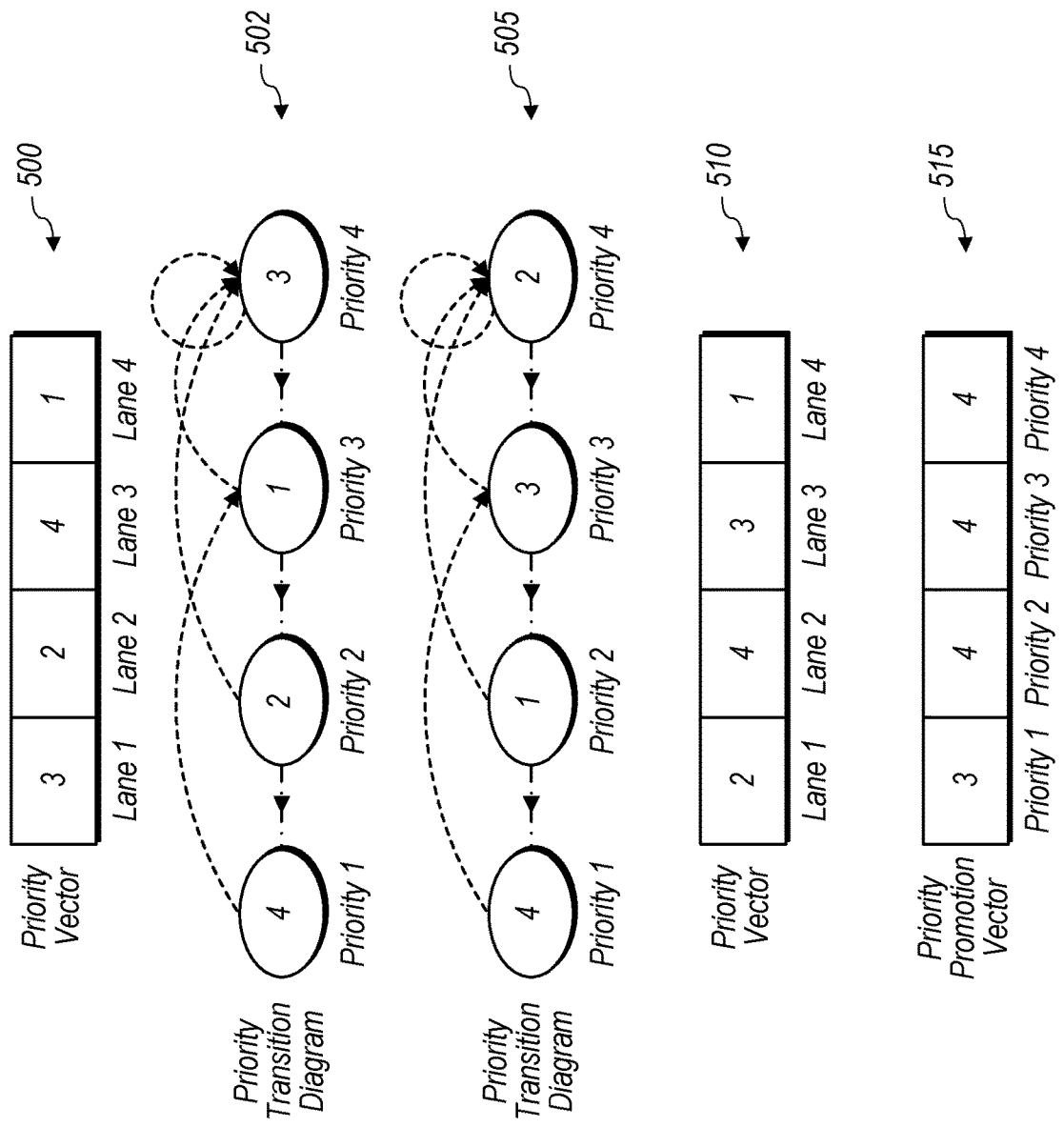
FIG. 5 illustrates priority transition diagrams and priority promotion vectors in accordance with one implementation.

Referring now to FIG. 5, priority transition diagrams and priority promotion vectors in accordance with one implementation are shown. In one implementation, a dynamic priority assignment scheme is employed to dynamically change a priority vector based on some event. The changed priority vector is then used to assign priorities to requests after the event. Priority transition diagram 502 shows one example for updating a priority vector 500 in response to the occurrence of an event. Each node in priority transition diagram 502 represents the priority level for a given lane in the priority vector. The number inside the circle represents the lane number, and the curved edges above the circles in priority transition diagram 502 point to the next priority level that lane will be assigned to in response to a certain event being detected for that lane. Examples of events include moving to a different set of program counters in a kernel, completion of the last memory response for a specific wavefront instruction, and others. For the other lanes which do not trigger the event, these lanes will shift down in priority as indicated by the horizontal arrows going right to left between the circles of priority transition diagram 502.

Without loss of generality, it is assumed for the purposes of this discussion that priority transition diagram 502 shows the priority changes for the last memory response from a wavefront instruction event. Accordingly, if the last response was for a request which mapped to lane 2 (priority 2), then that lane with priority 2 will transition to priority 4. The other lanes will be shifted down in priority, with lane 3 being shifted down from priority 4 to priority 3, with lane 1 being shifted down from priority 3 to priority 2, and with lane 4 staying at priority 1 since lane 4 was already at the lowest priority level. After this transition, priority transition diagram 505 shows the updated transition of priority based on the last memory response being for a request which mapped to lane 2. After the event has happened and the priority transition is completed according to priority transition diagram 505, the priority vector should be updated to reflect the new priority assignment as shown in priority vector 510. The next set of memory requests from a wavefront will use this updated priority assignment. Each time a new event is detected, the priority transition diagram and priority vectors will be updated based on the lane in which the new event was detected. While the example of the new event being the last response for a request was used for this particular discussion, it should be understood that other events can be used to trigger a priority vector update in other implementations.

It is noted that a priority transition diagram can be represented with a priority promotion vector. For example, the priority promotion vector for priority transition diagram 502 is shown as priority promotion vector 515. Priority promotion vector 515 shows the priorities to which the current priority should be promoted to in response to an event. Such a priority promotion vector can be generated by the same priority vector generation mechanism that was previously described in the discussion associated with FIG. 4 for the static priority assignment scheme. While the dynamic priority assignment is described as being used in response to detecting a single event, it can also be used in response to the detection of multiple events. For example, in one implementation, each event has its own priority transition diagram. Also, in another implementation, a single priority transition diagram is constructed with multiple events and/or combinations of events.

Figure 6:
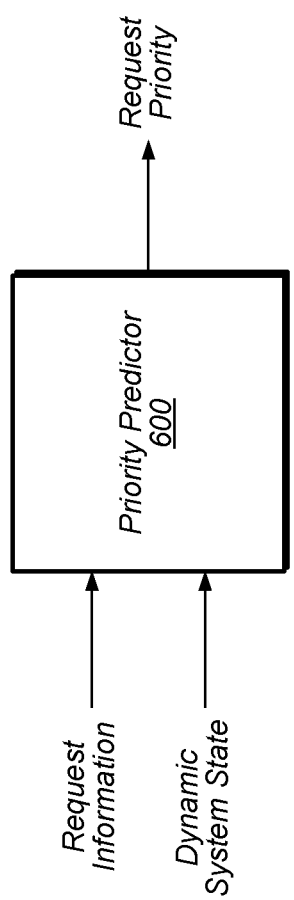
FIG. 6 is a block diagram of one implementation of a priority predictor.

Turning now to FIG. 6, a block diagram of one implementation of a priority predictor 600 is shown. In one implementation, the previously described priority vector is replaced with a priority predictor. As the program executes, the priority of each request is determined by performing a lookup based on some function of information about the request (e.g., program counter, wavefront ID, lane ID) as well as other available dynamic information (e.g., average request latency, cache hit rate, bandwidth utilization, stall counter values). In one implementation, the predictor is updated based on some optimization function, for example to reduce wait time latency divergence by increasing the priority of tail requests that delay completion of the wavefront. In one implementation, the predictor stores a history of information on executions of kernels. On subsequent executions of a given kernel, the priority predictor 600 retrieves the stored optimal predictor state or indexing function that was tuned by the optimization function. The priority predictor 600 then assigns priorities to memory requests of the work-items executing on corresponding lanes of the processor based on the retrieved optimal predictor state or optimal indexing function.

In one implementation, a training phase is used to determine the optimal predictor state or indexing function to be preloaded for a given kernel or class of kernels. Similar to the fitness function of genetic algorithms, this optimization function targets power, performance, or any other optimizations. The trained model is deployed when executing actual end-user applications and the model predicts the priority of each memory request dynamically based on the dynamic state of the system. The model receives the dynamic state and outputs the prioritization number for each memory request.

Figure 7:
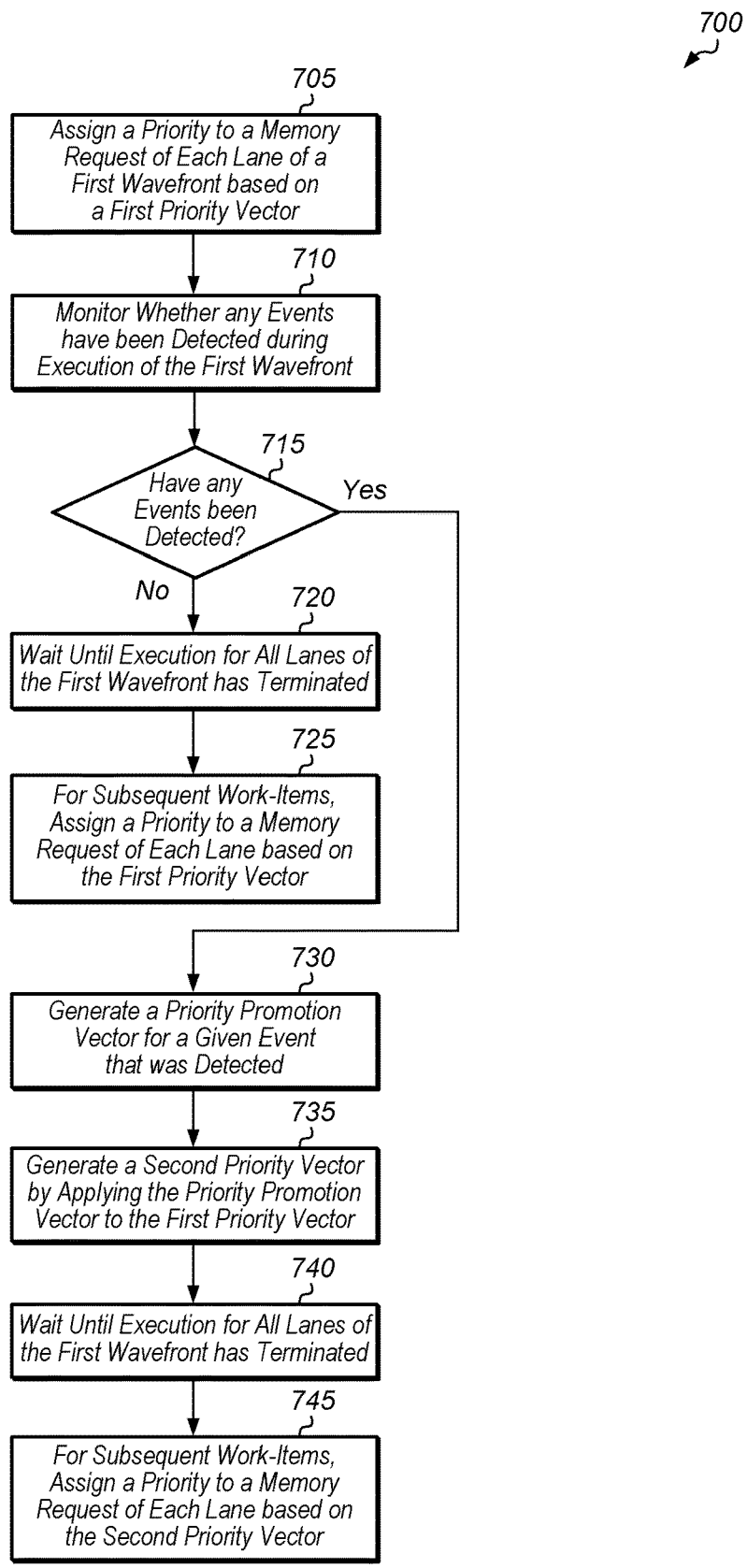
FIG. 7 is a generalized flow diagram illustrating one implementation of a method for dynamically applying priority promotion vectors to priority vectors based on a type of event detected.
Figure 8:
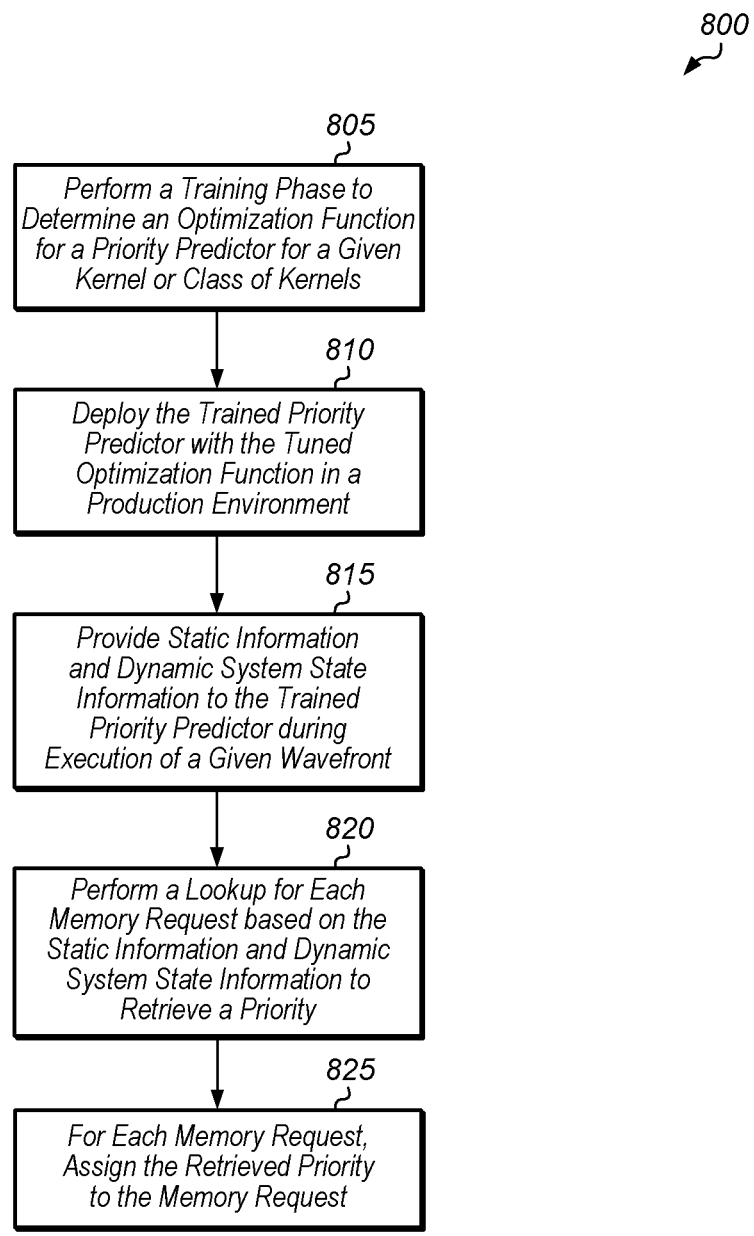
FIG. 8 is a generalized flow diagram illustrating one implementation of a method for using a priority predictor to determine priorities for memory requests of lanes of a wavefront.
Figure 9:
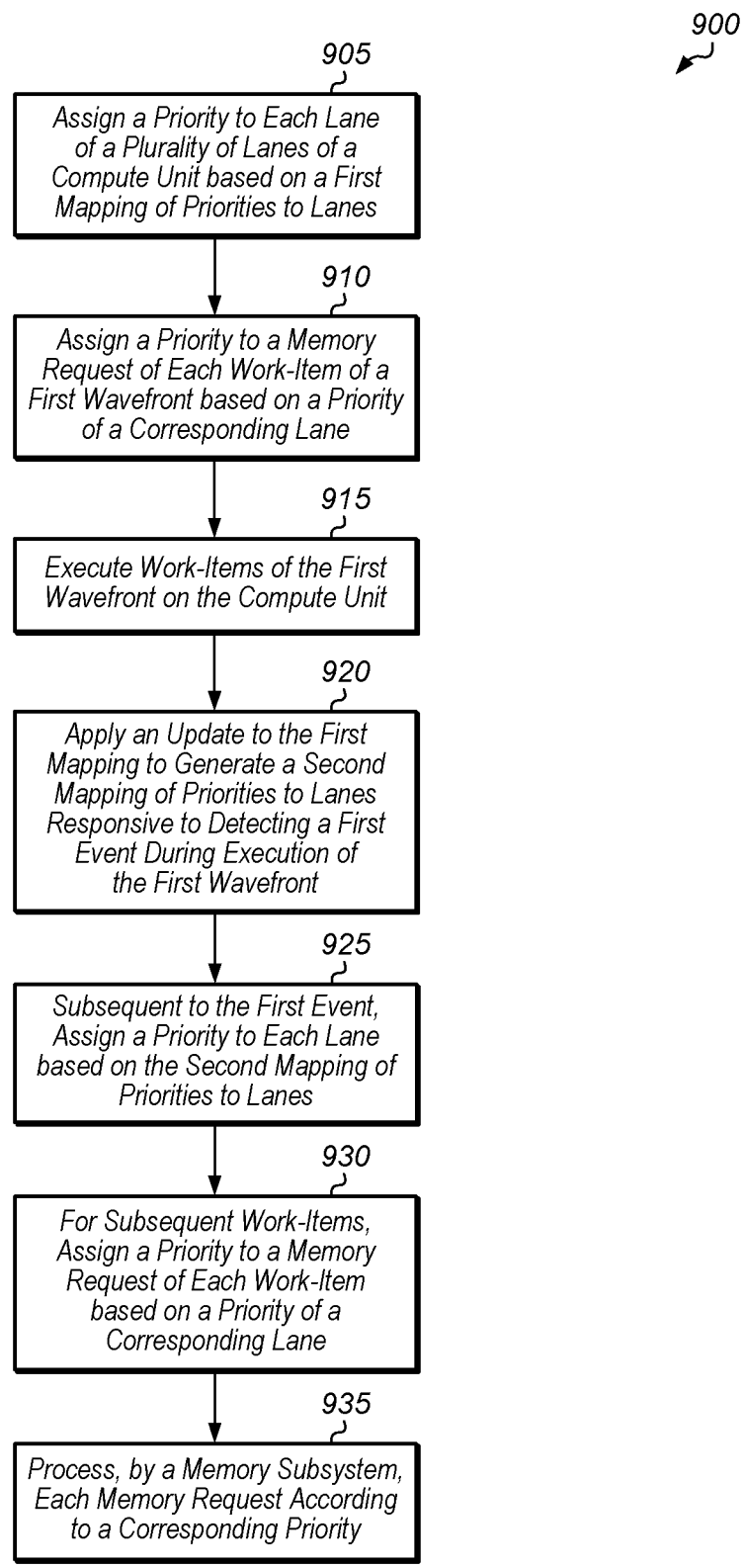
FIG. 9 is a generalized flow diagram illustrating one implementation of a method 900 for assigning priorities to memory requests.

Referring now to FIG. 7, one implementation of a method 700 for dynamically applying priority promotion vectors to priority vectors based on a type of event detected is shown. For purposes of discussion, the steps in this implementation and those of FIG. 8-9 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 700.

A processor assigns a priority to a memory request of each lane of a first wavefront based on a first priority vector (block 705). For example, in one implementation, the processor indexes into the first priority vector using information (e.g., lane ID) associated with the lane. The processor then retrieves a priority from the first priority vector at an entry determined by the index. The processor monitors whether any events have been detected during execution of the first wavefront (block 710). The types of events which the processor is trying to detect can vary according to the implementation. If none of the various events have been detected (conditional block 715, "no" leg), then the processor waits until execution has terminated for all lanes of the first wavefront (block 720). Next, for subsequent work-items, the processor assigns a priority to a memory request of each lane based on the first priority vector (block 725). It is noted that the memory requests referred to in block 725 can be generated by work-items of the first wavefront or of a second wavefront. After block 725, method 700 ends.

If a given event has been detected (conditional block 715, "yes" leg), then the processor generates a priority promotion vector for the given event (block 730). In one implementation, each different type of event has a separate priority promotion vector. It is noted that each priority promotion vector can be generated from a different corresponding priority transition diagram. Next, the processor generates a second priority vector by applying the priority promotion vector to the first priority vector (block 735). Then, the processor waits until execution has terminated for all lanes of the first wavefront (block 740). Next, for subsequent work-items, the processor assigns a priority to a memory request of each lane based on the second priority vector (block 745). It is noted that the subsequent work-items can come from the first wavefront or from a second wavefront. After block 745, method 700 ends. By implementing method 700 for dynamically updating priorities, priorities are assigned to memory requests in a more intelligent fashion which helps to reduce the amount of time spent waiting at a waitcnt( ) instruction.

Turning now to FIG. 8, one implementation of a method 800 for using a priority predictor to determine priorities for memory requests of lanes of a wavefront is shown. A training phase is performed to determine an optimization function for a priority predictor for a given kernel or class of kernels (block 805). Depending on the implementation, the optimization function can target power, performance, or another optimization. For example, in one implementation, the optimization function attempts to minimize lane-level divergence due to memory request processing times. In another implementation, the optimization function tries to maximize performance while executing the given kernel or class of kernels. In a further implementation, the optimization function attempts to minimize power consumption when executing the given kernel or class of kernels. In one implementation, the training phase involves using a machine learning model to train the optimization function based on a training set that is similar to the given kernel or class of kernels.

Next, the trained priority predictor with the tuned optimization function is deployed in a production environment (block 810). During execution of a given wavefront, static information (e.g., program counter, wavefront ID, lane ID) and dynamic system state information (e.g., average request latency, cache hit rate, bandwidth utilization, stall counter values) are provided to the trained priority predictor (block 815). Next, the trained priority predictor performs a lookup for each memory request based on the static information and dynamic system state information to retrieve a priority (block 820). Then, for each memory request, the trained priority predictor assigns the retrieved priority to the memory request (block 825). After block 825, method 800 ends.

Referring now to FIG. 9, one implementation of a method 900 for assigning priorities to memory requests is shown. Control logic assigns a priority to each lane of a plurality of lanes of a compute unit based on a first mapping of priorities to lanes (block 905). In one implementation, the first mapping of priorities to lanes is determined by a first priority vector. In one implementation, the first priority vector assigns a higher priority to work-items on a critical path. Also, the control logic assigns a priority to a memory request of each work-item of a first wavefront based on a priority of a corresponding lane (block 910). Next, the compute unit executes work-items of the first wavefront (block 915). The control logic applies an update to the first mapping to generate a second mapping of priorities to lanes responsive to detecting a first event during execution of the first wavefront (block 920). In one implementation, the update is a first priority promotion vector which is applied to the first priority vector to generate a second priority vector. In one implementation, the first event is a completion of a last memory request for a specific instruction of the first wavefront. In other implementations, the first event can be based on any of various other types of events.

Subsequent to the first event, the control logic assigns a priority to each lane based on the second mapping of priorities to lanes (block 925). Also, for subsequent work-items, the control logic assigns a priority to a memory request of each work-item based on a priority of a corresponding lane (block 930). It is noted that the work-items referred to in block 930 can come from the first wavefront or from a second wavefront different from the first wavefront. A memory subsystem processes each memory request according to a corresponding priority (block 935). After block 935, method 900 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
   a compute unit comprising a plurality of lanes configured to execute work-items of a wavefront in parallel; and
   control logic configured to:
   assign a first priority to each lane of a plurality of lanes of the compute unit based on a mapping of priorities to lanes;
   assign a priority to a memory request of each work-item of the wavefront based on a priority of a corresponding lane;
   execute work-items of the wavefront; and
   responsive to detecting a first event, wherein the first event is completion of a last memory request of the wavefront:
   assign a second priority to each lane of the plurality of lanes; and
   assign a priority to a memory request of each work-item based on a priority of a corresponding lane.

2. The processor as recited in claim 1, wherein the control logic is further configured to
   generate a first mapping of priorities and assign the first priority to each lane based on the first mapping;
   apply an update to the first mapping to generate a second mapping of priorities to lanes responsive to detecting the first event during execution of the wavefront; and
   assign the second priority based on the second mapping.

3. The processor as recited in claim 1, wherein the control logic is further configured to:
   perform a lookup for each memory request based on static information and dynamic system state information to retrieve a priority; and
   for each memory request, assign the retrieved priority to the memory request.

4. The processor as recited in claim 1, wherein each separate type of event has a corresponding update to apply to a mapping of priorities to lanes which is different from updates of other types of events.

5. The processor as recited in claim 4, wherein the control logic is further configured to apply an update to a mapping of priorities to lanes so as to minimize a memory divergence between different work-items of the wavefront.

6. The processor as recited in claim 4, wherein each application executed by the processor has a separate mapping of priorities to lanes assigned to the application.

7. A method comprising:
   assigning a first priority to each lane of a plurality of lanes of a compute unit based on a mapping of priorities to lanes;
   assigning a priority to a memory request of each work-item of a wavefront based on a priority of a corresponding lane;
   executing work-items of a wavefront;
   processing, by a memory subsystem, each memory request according to a corresponding priority;
   responsive to detecting a first event, wherein the first event is completion of a last memory request of the wavefront:
   assigning a second priority to each lane of the plurality of lanes; and assigning a priority to a memory request of each work-item based on a priority of a corresponding lane.

8. The method as recited in claim 7, further comprising: generating a first mapping of priorities and assigning the first priority to each lane based on the first mapping; applying an update to the first mapping to generate a second mapping of priorities to lanes responsive to detecting the first event during execution of the wavefront and assigning the second priority based on the second mapping.

9. The method as recited in claim 7, further comprising: performing a lookup for each memory request based on static information and dynamic system state information to retrieve a priority; and for each memory request, assigning the retrieved priority to the memory request.

10. The method as recited in claim 7, wherein each separate type of event has a corresponding update to apply to a mapping of priorities to lanes which is different from priority promotion vectors of other types of events.

11. The method as recited in claim 10, further comprising applying an update to a mapping of priorities to lanes so as to minimize a memory divergence between different work-items of the wavefront.

12. The method as recited in claim 10, wherein each application has a separate mapping of priorities to lanes assigned to the application.

13. A system comprising:
a processor coupled to a memory subsystem, wherein the processor is configured to:
execute work-items of a wavefront in parallel, wherein each work-item executes on a corresponding lane of a plurality of lanes of a compute unit;
assign a first priority to each lane of the plurality of lanes of the compute unit;
assign a priority to a memory request of each work-item of the wavefront based on a priority of a corresponding lane;
assign a second priority to each lane of the plurality of lanes, responsive to detecting a first event during execution of the wavefront;
subsequent to the first event:
assign a second priority to each lane such that at least one lane has a changed priority;

assign a priority to a memory request of each work-item based on a priority of a corresponding lane; and
apply an update to a previously generated first mapping to generate a second mapping of priorities to lanes responsive to detecting the first event during execution of the wavefront.

14. The system as recited in claim 13, wherein the first event is completion of a last memory request for a given instruction of the wavefront.

15. The system as recited in claim 13, wherein the processor is further configured to:
perform a lookup for each memory request based on static information and dynamic system state information to retrieve a priority; and
for each memory request, assign the retrieved priority to the memory request.

16. The system as recited in claim 13, wherein each separate type of event has a corresponding update to apply to a mapping of priorities to lanes which is different from updates of other types of events.

17. The system as recited in claim 16, wherein the processor is further configured to apply an update to a mapping of priorities to lanes so as to minimize a memory divergence between different work-items of the wavefront.

18. A system comprising:
a processor coupled to a memory subsystem, wherein the processor is configured to:
execute work-items of a wavefront in parallel, wherein each work-item executes on a corresponding lane of a plurality of lanes of a compute unit;
assign a first priority to each lane of the plurality of lanes of the compute unit;
assign a priority to a memory request of each work-item of the wavefront based on a priority of a corresponding lane;
assign a second priority to each lane of the plurality of lanes, responsive to detecting a first event during execution of the wavefront, wherein the first event is completion of a last memory request for a given instruction of the wavefront,
subsequent to the first event:
assign a second priority to each lane such that at least one lane has a changed priority; and
assign a priority to a memory request of each work-item based on a priority of a corresponding lane.

* * * * *